Jan. 19, 1960 A. VANDERVELD 2,921,643
RETRACTABLE STEP STRUCTURE
Filed Dec. 31, 1958 2 Sheets-Sheet 1
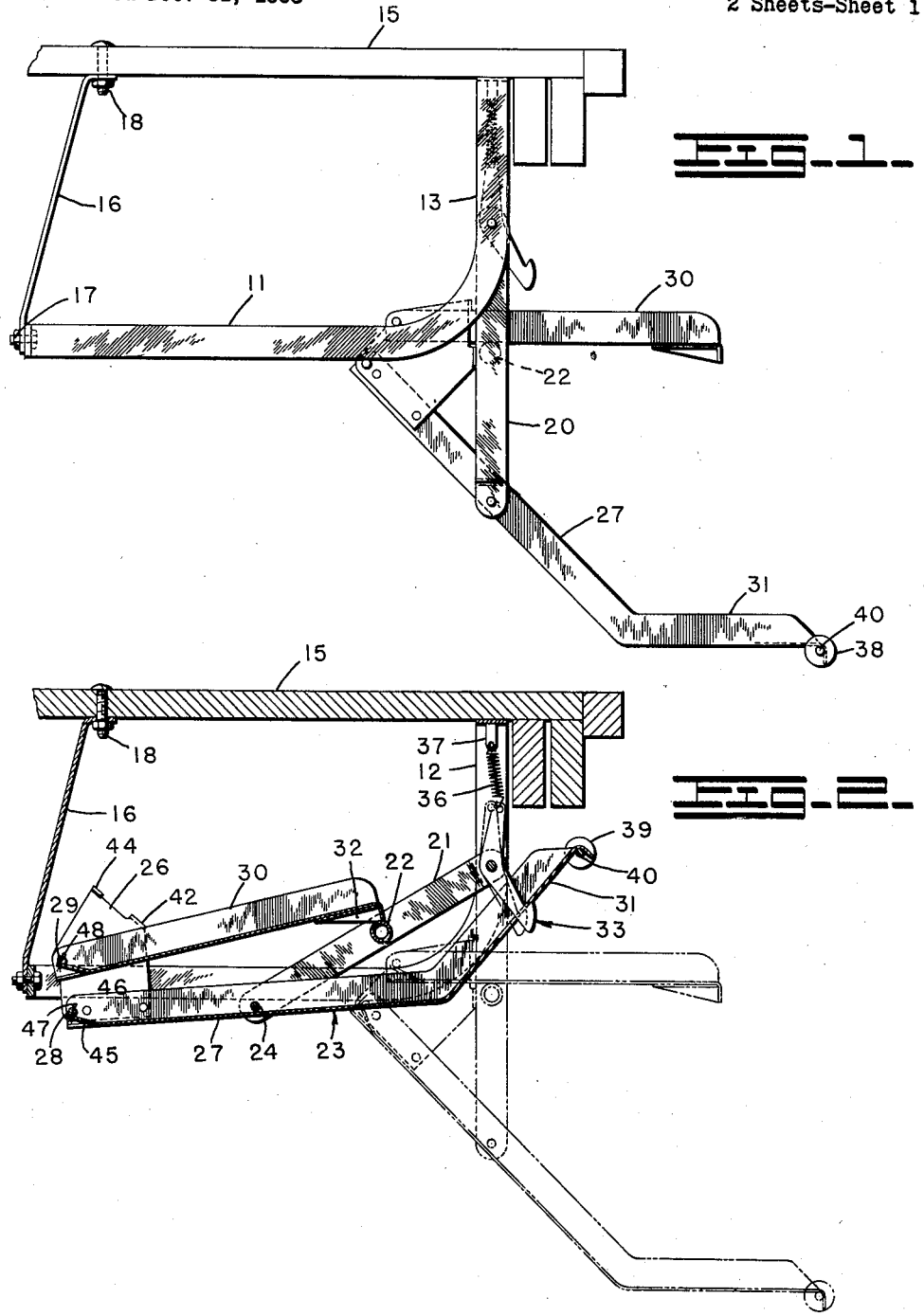
INVENTOR:
ANTHONY VANDERVELD
BY Jan. 19, 1960  A. VANDERVELD  2,921,643
RETRACTABLE STEP STRUCTURE
Filed Dec. 31, 1958  2 Sheets-Sheet 2
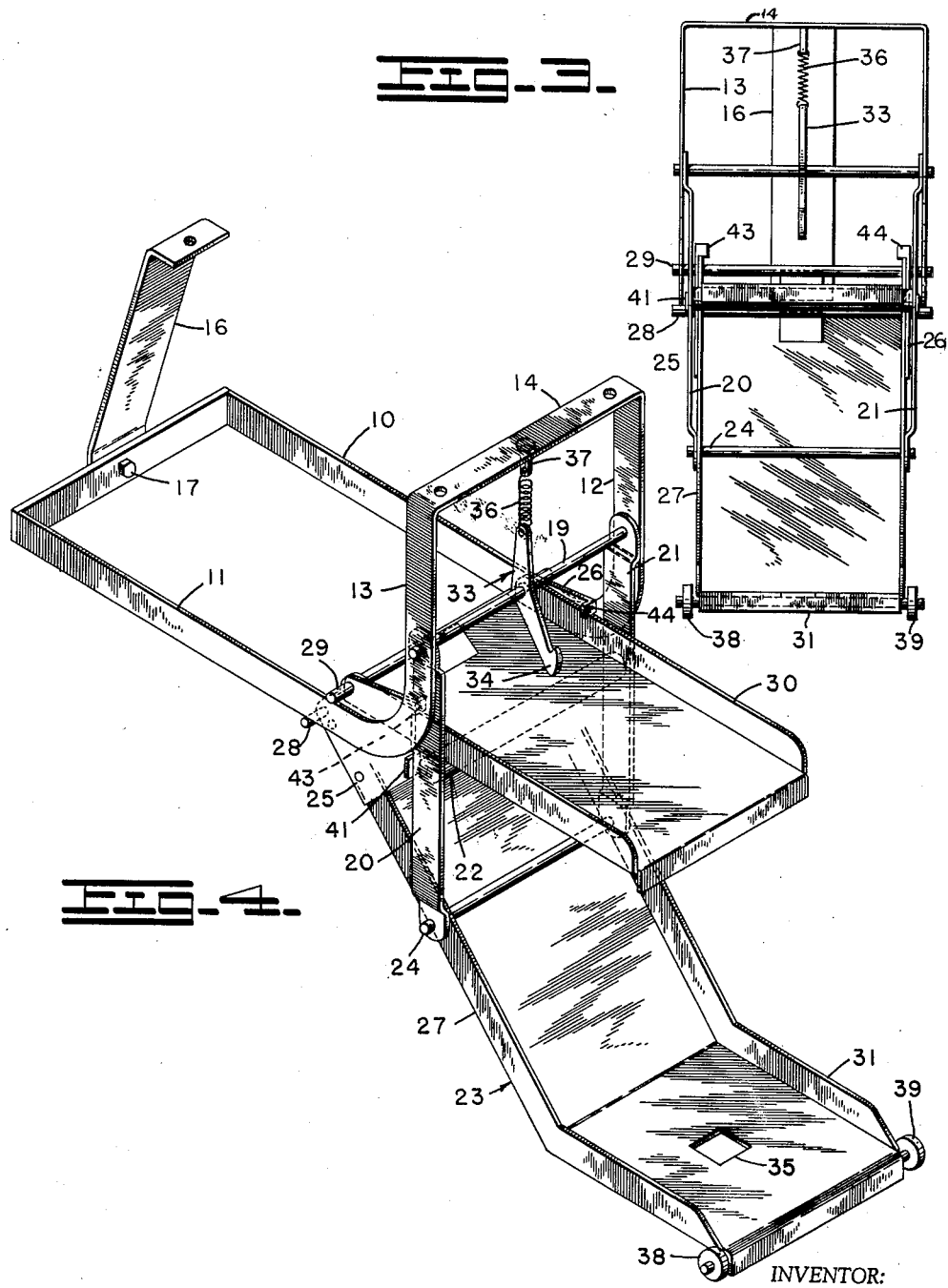
INVENTOR:
ANTHONY VANDERVELD
BY

United States Patent Office 2,921,643
Patented Jan. 19, 1960

2,921,643

RETRACTABLE STEP STRUCTURE

Anthony Vanderveld, Grand Rapids, Mich.

Application December 31, 1958, Serial No. 784,362

14 Claims. (Cl. 182—88)

This invention relates to the construction of retractable steps, and has been developed primarily in association with trucks. The distance from the floor of the truck to ground level presents a considerable inconvenience to the handlers of the freight, both with regard to getting the load to and from the floor of the truck, and because of the irksome necessity to scramble up and down between the truck and the ground a seemingly endless number of times during the course of the work day. This practice constitutes exercise of such a nature that it is not everyone that is capable of it; and even a man in excellent physical condition will eventually develop a degree of fatigue from these movements which will interfere with his ability to handle the freight. It is also generally recognized that a job which becomes irksome has an effect upon morale which transcends the tendency to fatigue.

The problem of raising and lowering the freight is handled (where it is economically feasible to do so) by mechanical attachments that can be incorporated in the rear portion of the truck to provide what amounts to an elevator operating between the ground level and the floor of the truck. Where the cost of such a unit is not warranted, it is at least possible to make it easier for the men themselves to get in and out of the truck without severe effort by using a set of steps. Since these steps must project out beyond the back of the truck when in use, it follows that they must incorporate some form of a retracting mechanism in order to make them completely acceptable for everyday usage. Several types of devices having some form of retracting movement have previously been devised and put into use.

The retracting system provided by this invention adequately performs the function of getting the step structure out of the way so that no normally-encountered condition will damage it. When in the projected position, the structure presents an exceptionally rigid and stable positioning of the supporting surfaces, and yet the unit is responsive to any forces applied in a generally horizontal direction from the rear such as would be encountered by accidentally backing into an obstruction while the steps are extended.

The several features of the invention will be discussed in detail through an analysis of the particular embodiments illustrated in the accompanying drawings. In the drawings:

Figure 1 presents a side elevation of a step structure embodying this invention, and in the projected position.

Figure 2 illustrates the same structure as shown in Figure 1, but in the retracted position. The extended position is shown in dotted lines for comparison.

Figure 3 presents a view from the rear of the structure shown in Figure 1.

Figure 4 is a perspective view of the structure in the extended position.

Referring to the drawings, a frame composed of the spaced parallel side rail sections 10 and 11 also includes the vertical portions 12 and 13 connected by the cross member 14 provided with suitable holes for attachment to the underside of the floor 15 of a truck as shown in Figure 1. The rear portion of the frame is connected to the floor structure 15 by the strap 16, this being secured to the frame by the bolt 17, and to the floor by the bolt 18. It is preferable that the strap 16 be of sufficiently light material so that it can be fairly easily bent to engage the floor at any desired point within a considerable range in order to avoid any particular truck structure that might be in the way.

A transverse rod 19 extends between the opposite sides of the frame, and provides a pivot connection for the links 20 and 21. These links are connected at an intermediate point by a beam 22, and the lower extremity of the links is pivotally connected to the lower step unit 23 by the rod 24. Plates 25 and 26 are secured to the inner end of the slanted supporting portion 27 of the lower step unit 23, and rods 28 and 29 extend between these plates and continue beyond the rail sections 10 and 11 so that the extensions of the rod embrace the rail sections to serve as a guide to the structure associated with the plates 25 and 26. The inner end of the upper step unit 30 is pivotally engaged by the rod 29, which results in the inner end of both step units having a sliding engagement with the rail sections 10 and 11. It is this sliding relationship which becomes the retracting movement carrying the steps into the position shown in Figure 2. The rods 28 and 29 are conveniently positioned axially by bending sections of material from the lower and upper step units, as shown at 45 and 46, so that these bent sections closely approach the rods. Cotter pins 47 and 48 engage both the rods and the bent sections.

The upper step is supported by the sliding engagement with the rail sections 10 and 11 and by the beam 22. Application of force in a rearward and possibly slightly upward direction at the outer end of the lower step surface 31 will cause the inner ends of the upper and lower step units to slide along the side rails 10 and 11 on the projections of the rods 28 and 29. This movement is accompanied by a rearward swinging of the links 20 and 21 which elevates the lower step by means of the pivot connection at the rod 24, and also elevates the upper step 30 because of the movement of the transverse rod 22. Since the beam 22 has a relative sliding movement with respect to the underside of the step 30, the elevation of the step can be increased by incorporating a cam 32 as shown best in Figure 2. The latch 33 can be conveniently mounted on the rod 19, and has a hook 34 which engages the lower steps 31 at the edge of the opening 35. The tension spring 36 extends between the latch 33 and the stud 37 which may be considered as fixed with respect to the horizontal portion 14 of the frame.

Since one of the main problems encountered in the use of structures of this type is the effect of accidentally backing into an abutment with the step extended, this invention has an arrangement which facilitates the movement of the structure to the folded position as the abutment is encountered. The rollers 38 and 39 are mounted on the shaft 40 in a position such that the periphery of the rollers is beyond the end of the lower step 31. A vertical surface of an abutment will therefore be encountered primarily by the rollers, which facilitates the upward movement involved in passing from the extended to the folded position shown in Figure 2. As the truck backs into the obstruction, the rollers move upwardly along the obstruction as the step moves into the folded position.

It is desirable to provide a position stop for establishing the extended position of the structure, and this is conveniently done by forming the plates 25 and 26 with the outwardly-extending ears 41 and 42. These are positioned to engage the edges of the links 20 and 21 as is most clearly shown in Figure 4. The position of these ears is such that they do not extend laterally far enough to interfere with the rails 10 and 11 during the folding movement, but move upwardly between them.

It is also desirable to incorporate an arrangement for holding the step 30 downward about its pivot connection to the rod 29 with the unit in the extended position so that one cannot accidentally tip the step out of supporting position. This is accomplished by providing the plates 25 and 26 with the inwardly-turned ears 43 and 44. These are positioned to extend over the upper edges of the step to maintain its position.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. A retractable step device for attachment to the under side of a load carrying platform, comprising: an inner support rigidly attached to the under side of said platform; a pair of spaced apart horizontal guide rails attached at their inner ends near the bottom of said inner support, and extending outwardly therefrom toward the outer edge of said platform and having upwardly extending portions adapted to be secured to the under side of said platform near the outer edge thereof; a crossrod extending between and through the said upwardly extending portions; an H shaped member comprising two side links having holes through their upper and lower ends and a spacing member between the said links and rigidly attached thereto, said H shaped member adapted to swing freely on the said crossrod between said upwardly extending portions of said guide rails; a second rod extending between and through the lower ends of said H shaped member; a retractable step member tiltably mounted on the said second rod, said second rod passing through holes in said step at a point intermediate the ends thereof; plates attached, one on each side, to the inner ends of the said step member, said plates having vertically spaced holes; two guide rods, one engaged in the lower of said holes and extending underneath the said guide rails and beyond, the other engaged in the upper of said holes and extending above the said guide rails and beyond, said guide rods acting to guide the inner end of the said step in a normally horizontal plane, while the said H shaped member attached to the said tiltable step at the said intermediate point swings the outer end of the said step in a backward and upward direction to its raised and retracted position.

2. The retractable step device defined in claim 1, and an intermediate step positioned between the above described step and the load carrying platform and pivotally mounted at its inner end on the upper one of the said two guide rods, the outer end of said intermediate step riding loosely on the top of the said spacing member of the H shaped member, the front end of said intermediate step rising as the said H shaped member swings inwardly and upwardly.

3. The retractable step device defined in claim 1, said plates having ears disposed to stop the downward and forward swing of the said H shaped member when said member reaches a substantially vertical position.

4. The retractable step device defined in claim 2, said plates having ears bent toward the center and above the said intermediate step to prevent lifting of its outer end when the said step is in projected position.

5. The retractable step device defined in claim 2, and a retaining latch to hold the first described step member in its retracted position.

6. A retractable step structure, comprising: a frame including opposite and normally substantially horizontal rail sections; a pair of opposite links pivotally mounted on said frame coaxially and above the level of said rail sections; a rod coaxial with the axis of pivotal mounting of said links and supported by said frame; a beam extending between and connected to each of said links at an intermediate point thereon parallel to the axis of pivotal mounting thereof; a pair of opposite plates adjacent each of said rail sections, respectively; an upper step pivotally connected at its inner end to said plates by a rod extending over the top of said rail sections, and slideably supported by said beam; a lower step having a normally horizontal portion when said lower step is in projected position, and also having a supporting portion secured to said plates, said links being pivotally connected to an intermediate point on said supporting portion; a rod extending between said plates and underneath said rail sections; and roller means projecting beyond said horizontal portion and mounted on said lower step for rotation on an axis substantially parallel to the axis of pivotal mounting of said links; latch means adapted to engage said lower step in retracted position with respect to said frame; stop means on said plates engageable with said links to limit the outward movement of said lower step; and stop means on said plates overhanging the edges of said upper step with said steps in projected position.

7. A retractable step structure, comprising: a frame including opposite and normally substantially horizontal rail sections; a pair of opposite links pivotally mounted on said frame coaxially and above the level of said rail sections; a rod coaxial with the axis of pivotal mounting of said links and supported by said frame; a beam extending between and connected to each of said links at an intermediate point thereon parallel to the axis of pivotal mounting thereof; a pair of opposite plates adjacent each of said rail sections, respectively; an upper step pivotally connected at its inner end to said plates by a rod extending over the top of said rail sections, and slideably supported by said beam; a lower step having a normally horizontal portion when said lower step is in projected position, and also having a supporting portion secured to said plates, said links being pivotally connected to an intermediate point on said supporting portion; a rod extending between said plates and underneath said rail sections; and latch means adapted to engage said lower step in retracted position with respect to said frame.

8. A retractable step structure, comprising: a frame including opposite and normally substantially horizontal rail sections; a pair of opposite links pivotally mounted on said frame coaxially and above the level of said rail sections; a beam extending between and connected to each of said links at an intermediate point thereon parallel to the axis of pivotal mounting thereof; a pair of opposite plates adjacent each of said rail sections, respectively, and slideable thereon; an upper step pivotally connected with respect to said frame at its inner end to said plates, and slideably supported by said beam; a lower step having a normally horizontal portion when said lower step is in projected position, and also having a supporting portion secured to said plates and pivotally mounted with respect to said frame, said links being pivotally connected to an intermediate point on said supporting portion; stop means on said plates limiting the outward movement of said lower step; and stop means on said plates overhanging the edges of said upper step with said steps in projected position.

9. A retractable step structure, comprising: a frame including opposite and normally substantially horizontal rail sections; a pair of opposite links pivotally mounted on said frame coaxially and above the level of said rail sections; a beam extending between and connected to each of said links at an intermediate point thereon parallel to the axis of pivotal mounting thereof; a pair of opposite plates adjacent each of said rail sections, respectively; an upper step pivotally connected at its inner end to said plates by a rod extending over the top of said rail sections, and slideably supported by said beam; a lower step having a normally horizontal portion when said lower step is in projected position, and also having a supporting portion secured to said plates, said links being pivotally connected to an intermediate point on said supporting portion; a rod extending between said plates and underneath said rail sections; stop means on said plates limiting the outward movement of said lower step; and stop means on said plates overhanging the edges of said upper step with said steps in projected position.

10. A retractable step structure, comprising: a frame including opposite and normally substantially horizontal rail sections; a pair of opposite links pivotally mounted on said frame coaxially and above the level of said rail sections; a beam extending between and connected to each of said links at an intermediate point thereon parallel to the axis of pivotal mounting thereof; a pair of opposite plates adjacent each of said rail sections, respectively; an upper step pivotally connected at its inner end to said plates by a rod extending over the top of said rail sections, and slideably supported by said beam; a lower step having a normally horizontal portion when said lower step is in projected position, and also having a supporting portion secured to said plates, said links being pivotally connected to an intermediate point on said supporting portion; and a rod extending between said plates and underneath said rail sections.

11. A retractable step structure, comprising: a frame including opposite and normally substantially horizontal rail sections; a pair of opposite links pivotally mounted on said frame coaxially and above the level of said rail sections; a beam extending between and connected to each of said links at an intermediate point thereon parallel to the axis of pivotal mounting thereof; an upper step slideably and pivotally mounted at its inner end on said rail sections, and slideably supported by said beam; a lower step having a normally horizontal portion when said lower step is in projected position, and also having a supporting portion slideably and pivotally mounted on said rail sections, said links being pivotally connected to an intermediate point on said supporting portion; and roller means projecting beyond said horizontal portion and mounted on said lower step for rotation on an axis substantially parallel to the axis of pivotal mounting of said links.

12. A retractable step structure, comprising: a frame including opposite and normally substantially horizontal rail sections; a pair of opposite links pivotally mounted on said frame coaxially and above the level of said rail sections; a beam extending between and connected to each of said links at an intermediate point thereon parallel to the axis of pivotal mounting thereof; an upper step slideably and pivotally mounted at its inner end on said rail sections, and also slideably supported by said beam; a lower step having a normally horizontal portion when said lower step is in projected position, and also having a supporting portion slideably and pivotally mounted on said rail sections, said links being pivotally connected to an intermediate point on said supporting portion.

13. The retractable step device defined in claim 1, with the H-shaped member positioned to cause the said step member to automatically swing downwardly and outwardly to fully extended position upon release thereof from retracted position.

14. The retractable step device defined in claim 5, in which said H-shaped member is disposed to induce movement of said step members toward fully extended position upon release of said latch.

References Cited in the file of this patent

UNITED STATES PATENTS

| | | |
|---|---|---|
| 2,122,040 | Machovec | June 28, 1938 |
| 2,153,945 | Thelander | Apr. 11, 1939 |
| 2,492,068 | Schofield | Dec. 20, 1949 |
| 2,544,799 | McCann | Mar. 13, 1951 |
| 2,682,671 | Faure | July 6, 1954 |
| 2,747,888 | Jones | May 29, 1956 |